US 9,602,491 B2

(12) United States Patent
Sato

(10) Patent No.: US 9,602,491 B2
(45) Date of Patent: Mar. 21, 2017

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Kei Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 142 days.

(21) Appl. No.: 14/553,042

(22) Filed: Nov. 25, 2014

(65) Prior Publication Data

US 2015/0172267 A1    Jun. 18, 2015

(30) Foreign Application Priority Data

Dec. 16, 2013    (JP) ................................ 2013-259506

(51) Int. Cl.
    *G06F 17/30*       (2006.01)
    *H04L 29/06*       (2006.01)

(52) U.S. Cl.
    CPC ............ *H04L 63/08* (2013.01); *H04L 63/102* (2013.01)

(58) Field of Classification Search
CPC ...... G06F 21/608; G06F 21/31; G06F 3/1222; G06F 3/1238; G06F 2221/2141; H04N 2201/0094; H04N 2201/3236; H04N 1/44; H04L 63/08
USPC .......................................................... 726/3
See application file for complete search history.

(56) References Cited

U.S. PATENT DOCUMENTS

| 9,282,214 B2 | 3/2016 | Sato | |
| 2012/0023558 A1* | 1/2012 | Rafiq | ...................... H04L 63/08 726/6 |
| 2012/0260350 A1* | 10/2012 | Yamada | ............. H04N 1/00411 726/28 |
| 2013/0159991 A1 | 6/2013 | Sato | |

FOREIGN PATENT DOCUMENTS

JP      2005-267201 A     9/2005

* cited by examiner

*Primary Examiner* — Brian Shaw
(74) *Attorney, Agent, or Firm* — Fitzpatrick, Cella, Harper & Scinto

(57) ABSTRACT

An information processing apparatus usable via a plurality of user interfaces, and a method of controlling the same, having a plurality of authentication processing modules configured to perform a user authentication for each of the plurality of user interfaces respectively. Setting information of authentication processing for each of the plurality of authentication processing modules and setting information of authentication processing by a common authentication processing module for performing a user authentication common to the plurality of user interfaces are held. If the user authentication by the common authentication processing module succeeds using the held setting information, based on user information input via an authentication screen of any one of the plurality of user interfaces, the user authentication is performed based on the held setting information of the user interface.

12 Claims, 13 Drawing Sheets

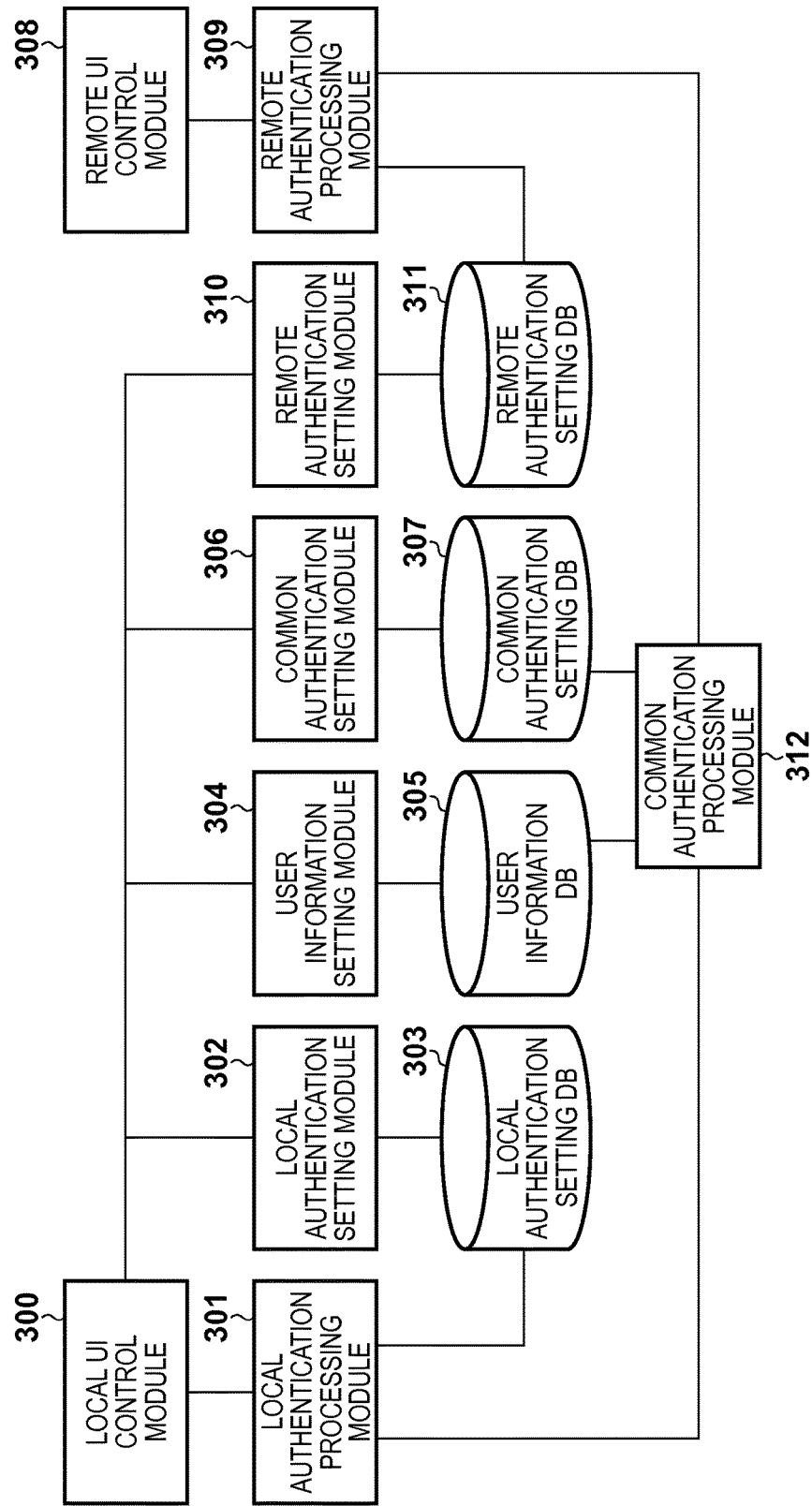

FIG. 4A

| USER ID | PASSWORD | ROLE |
|---------|----------|------|
| UserA | ***** | Administrator |
| UserB | ***** | Power User |
| UserC | ***** | General User |
| Guest | - | Guest user |

| ROLE | COPY | TRANSMIT | SAVE | SET |
|------|------|----------|------|-----|
| Administrator | PERMIT | PERMIT | PERMIT | PERMIT |
| Power User | PERMIT | PERMIT | PERMIT | PROHIBIT |
| General User | PERMIT | PROHIBIT | PERMIT | PROHIBIT |
| Guest user | PERMIT | PROHIBIT | PROHIBIT | PROHIBIT |

LOCAL AUTHENTICATION SETTING TABLE

| SETTING ITEM | SETTING VALUE |
|---|---|
| ROLE PERMITTED TO LOGIN | General user |
| GUEST USER USAGE | ON |
| AUTHENTICATION SERVER USAGE | ON |

FIG. 5B

REMOTE AUTHENTICATION SETTING TABLE

| SETTING ITEM | SETTING VALUE |
|---|---|
| ROLE PERMITTED TO LOGIN | Administrator |
| GUEST USER USAGE | OFF |
| AUTHENTICATION SERVER USAGE | OFF |

FIG. 5C

COMMON AUTHENTICATION SETTING TABLE

| SETTING ITEM | SETTING VALUE |
|---|---|
| ROLE PERMITTED TO LOGIN | General user |
| GUEST USER USAGE | ON |
| AUTHENTICATION SERVER USAGE | ON |

FIG. 10

SETTING > USER INFORMATION

SET USER INFORMATION

| USER ID (1001) | PASSWORD (1002) | ROLE (1003) |
|---|---|---|
| User A | ***** | SELECT ROLE ▼ |
| User B | ***** | Administrator |
| User C | ***** | Power User |
| | | General User |

1005 — CANCEL    OK — 1004

LOG OUT

FIG. 11A

SETTING > AUTHENTICATION MANAGEMENT > LOCAL AUTHENTICATION

LOCAL AUTHENTICATION SETTINGS.
COMMON SETTINGS ARE PRIORITIZED OVER THESE SETTINGS.

■ ROLE PERMITTED TO LOG IN
 LOCAL AUTHENTICATION

SELECT ▼
 Administrator OR GREATER
 Power User OR GREATER — 1101
 General User OR GREATER

1102

■ GUEST USER USAGE IN LOCAL
 AUTHENTICATION    1106
   ● ON    ○ OFF

■ AUTHENTICATION SERVER USAGE
 IN LOCAL AUTHENTICATION
   ● ON    ○ OFF

1104 — CANCEL    OK — 1103

LOG OUT

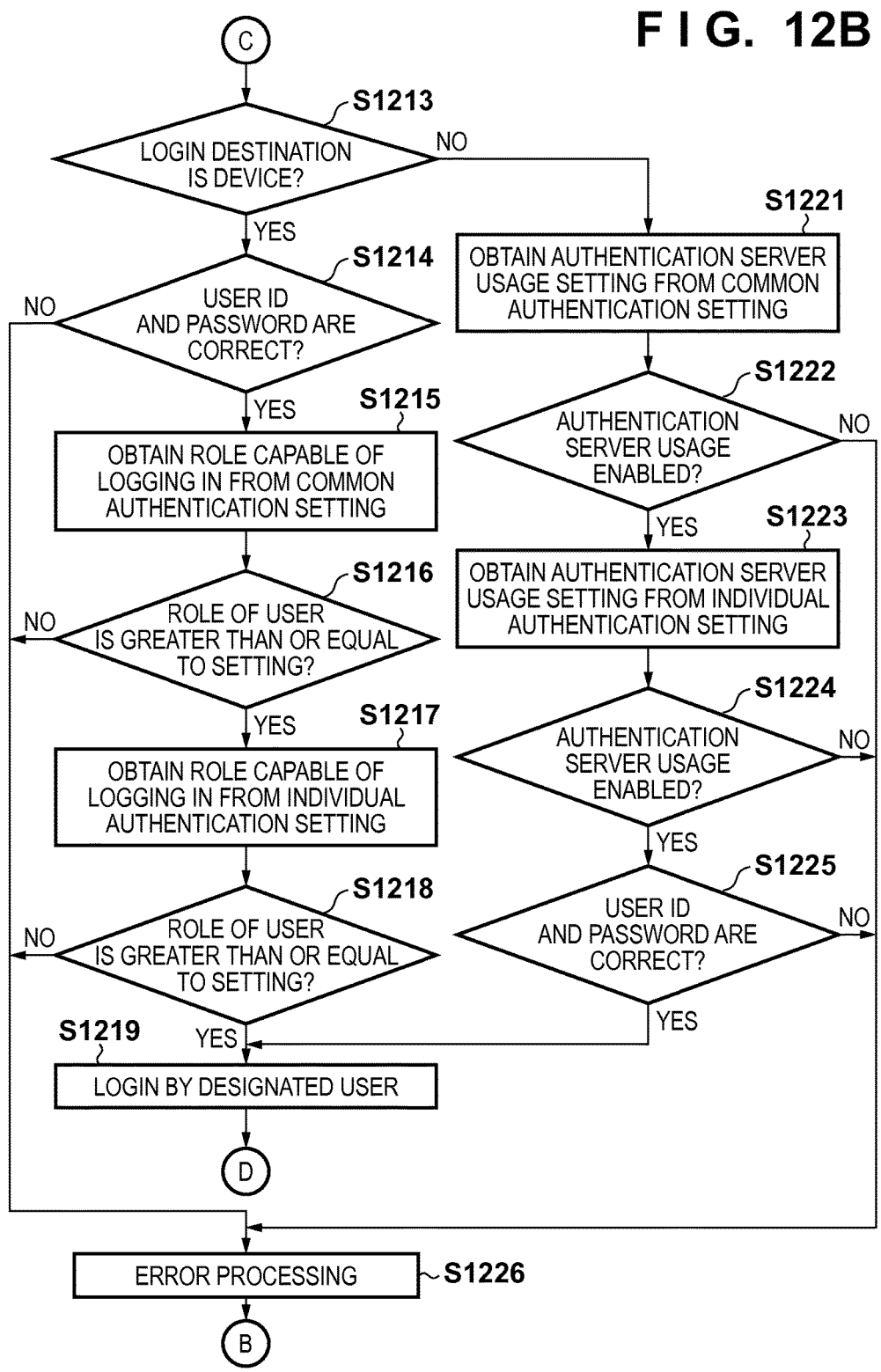

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

In recent years, among multi function peripherals, users are able to use functions equipped in the multi function peripherals via a variety of user interfaces (hereinafter referred to as UIs). For example, as UIs that a multi function peripheral provides, there are operation panels mounted on the multi function peripheral (hereinafter referred to as a local UI), Web pages that can be accessed from a Web browser on a PC connected to the multi function peripheral via a network (hereinafter referred to as a remote UI), or the like. Because functions of the multi function peripheral can be used from both of these UIs, by arranging a function for performing a user authentication (hereinafter referred to as an authentication service) for each UI, configuration is taken such that a user can authenticate without exception regardless of which UI is accessed.

Also, Japanese Patent Laid-Open No. 2005-267201 discloses a multi function peripheral that provides an arrangement in which it is possible to later add and switch authentication services, in order to handle a case where a new UI is added to the multi function peripheral, and even a new authentication system.

In a case where it is desired that different authentication methods can be employed for each authentication service corresponding to the respective UIs, individual authentication settings are arranged for each authentication service, and each authentication service can be realized by the user authenticating independently in accordance with these authentication settings. However, there is a problem in that unified security cannot be guaranteed across all of the authentication services. In a case where, in this way, unified security cannot be guaranteed, there is the possibility that a route will be generated by which a user, access by whom is not desired to be allowed, is able to access a function of the multi function peripheral, and it is envisioned that the multi function peripheral, through such a route, would be used by a user, allowance of access by whom is not desired.

As examples in which different authentication methods are performed for each authentication service, the followings are given. For example, logging in as a guest user that can use only a part of the functions of the multi function peripheral without authentication (hereinafter referred to as a guest login) is permitted only in a case where the user is authenticated by a local UI. Meanwhile, with a remote UI, only a user having an authority of an administrator of the multi function peripheral is allowed to use the multi function peripheral.

Meanwhile, as an example in which it is desired that unified security be guaranteed across all authentication services, a case can be considered in which it is not desired that a guest login be permitted for a local authentication or a remote authentication. Even in the case where a login service is added later, a case can be considered in which it is desired that the same authentication setting be applied across all authentication services. In order to satisfy both of these demands, it is necessary to realize an authentication system that is able to perform different authentication functions for each authentication service while providing a unified user authentication.

SUMMARY OF THE INVENTION

An aspect of the present invention is to eliminate the above-mentioned problems with conventional technology.

A feature of the present invention is to provide a technique that realizes a unified user authentication across a plurality of user interfaces, and realizes a user authentication differing for each user interface.

The present invention in an aspect provides an information processing apparatus usable via a plurality of user interfaces, the apparatus comprising: a plurality of authentication units configured to respectively perform user authentication with respect to the plurality of user interfaces; a first holding unit configured to hold setting information of authentication processing for each of the plurality of authentication units; a common authentication unit configured to perform a user authentication common to the plurality of user interfaces; a second holding unit configured to hold setting information of authentication processing by the common authentication unit; and a control unit configured to control to perform, in a case where, based on user information input via an authentication screen of any one of the plurality of user interfaces, the user authentication by the common authentication unit succeeds based on the setting information held in the second holding unit, the user authentication by the authentication unit based on the setting information of the any one of the user interfaces held in the first holding unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a block diagram for explaining a software configuration of the MFP according to embodiments.

FIG. 4A depicts a view illustrating an example of a user information table.

FIG. 4B depicts a view illustrating an example of a role information table.

FIG. 5A depicts a view illustrating an example of a local authentication setting table.

FIG. 5B depicts a view illustrating an example of a remote authentication setting table.

FIG. 5C depicts a view illustrating an example of a common authentication setting table.

FIG. 10 depicts a view illustrating an example of a screen for setting information relating to a user.

FIG. 11A depicts a view for showing an example of a screen for performing settings related to a local authentication of a user.

FIGS. 12A and 12B are flowcharts for describing a user authentication processing performed by the MFP according to the embodiment.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention. Note that, in the present embodiment, explanation will be given with the example of a multi function peripheral (MFP) as an example of the information processing apparatus of the present invention.

Figure 1:
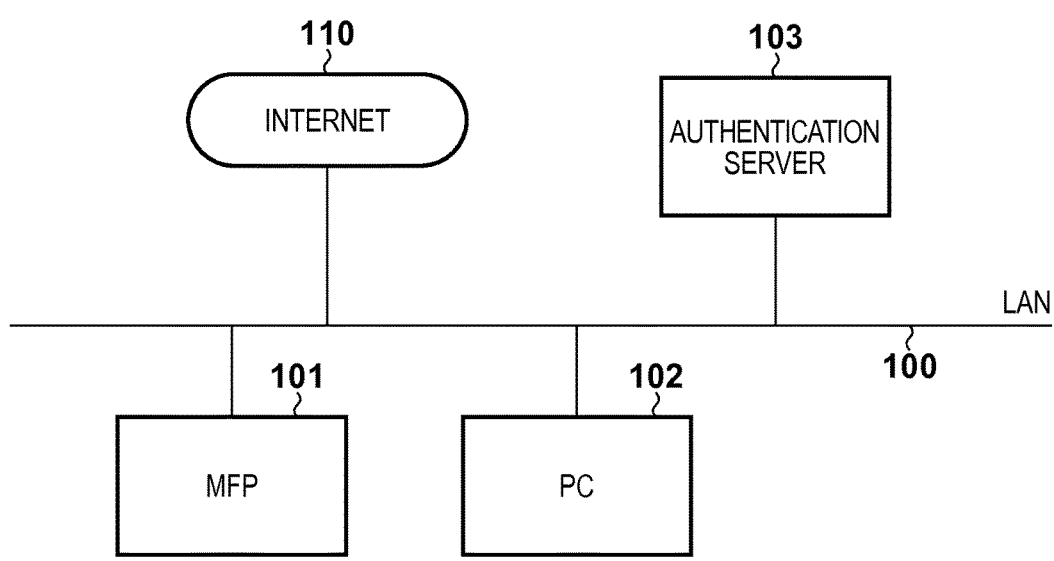
FIG. 1 depicts a view for explaining a system including an MFP according to embodiments of the present invention.

FIG. 1 depicts a view for explaining a system including an MFP 101 according to embodiments of the present invention.

In this system, the MFP 101, a PC 102, and an authentication server 103 are connected via a LAN 100, and the LAN 100 is connected to the Internet 110. The PC 102 performs management of the MFP 101 using a Web browser, makes a print instruction to the MFP 101 using a print driver, or the like. The authentication server 103 is a server that receives a query from the MFP 101, and performs a user authentication for a user of the MFP 101, and it is able to manage a plurality of MFP users in consolidation.

Figure 2:
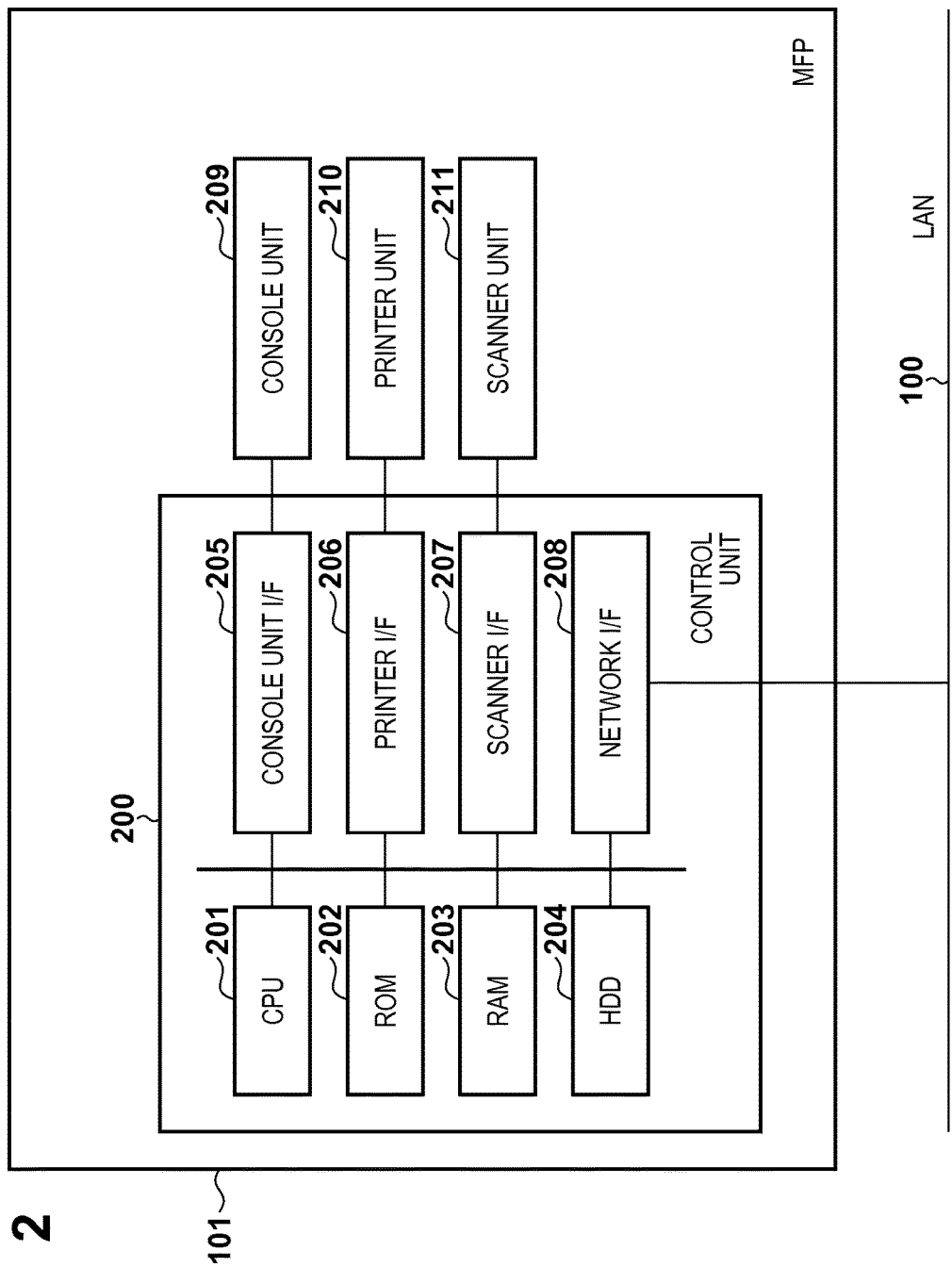
FIG. 2 is a block diagram for showing a hardware configuration of the MFP according to embodiments.

FIG. 2 is a block diagram for showing a hardware configuration of the MFP 101 according to embodiments.

A control unit 200 controls overall operation of the MFP 101. The control unit 200 comprises a CPU 201, a ROM 202, a RAM 203, an HDD 204, a console unit I/F 205, a printer I/F 206, a scanner I/F 207, and a network I/F 208. The CPU 201, in accordance with control programs stored in the ROM 202, performs various controls such as control of reading by a scanner unit 211, control of print processing using a printer unit 210, transmission and reception with the LAN 100, or the like. The RAM 203 is used as a temporary storage area such as a main memory or a work area of the CPU 201. The HDD (hard disk drive) 204 stores image data, various programs, or various data that is explained later. The console unit I/F 205 connects a console unit 209 and the control unit 200. The printer I/F 206 connects the printer unit 210 and the control unit 200. Image data to be printed by the printer unit 210 is transmitted to the printer unit 210 from the control unit 200 via the printer I/F 206, and printed to a printing medium (sheet) by the printer unit 210. The scanner I/F 207 connects a scanner unit 211 and the control unit 200. The scanner unit 211 generates image data corresponding to an original image by reading the image on the original, and inputs the image data into the control unit 200 via the scanner I/F 207. The network I/F 208 connects the control unit 200 (MFP 101) to the LAN 100. The network I/F 208 transmits information to an external apparatus (for example, the authentication server 103) on the LAN 100, and receives various information from the external apparatus on the LAN 100.

FIG. 3 is a block diagram for explaining a software configuration of the MFP 101 according to embodiments. Here, while there is no particular limitation, each module is realized by the CPU 201 executing a control program stored in the ROM 202.

A local UI (local user interface) control module 300 provides a function of controlling the console unit 209 via the console unit I/F 205. The local UI control module 300 notifies modules such as setting modules and processing modules of contents of an operation of a user on the console unit 209. Also, the local UI control module 300 receives a screen display request from one of the modules, and performs control in order to display a screen on the console unit 209. While there is no particular limitation, the modules display an operation screen on a display unit of the console unit 209 via the local UI control module 300.

A local authentication processing module 301 provides a local authentication function for performing an authentication of a user when the user uses the MFP 101 via a local UI including the console unit 209. The local authentication processing module 301 displays a local authentication screen such as shown in FIG. 6A.

Figure 6A:
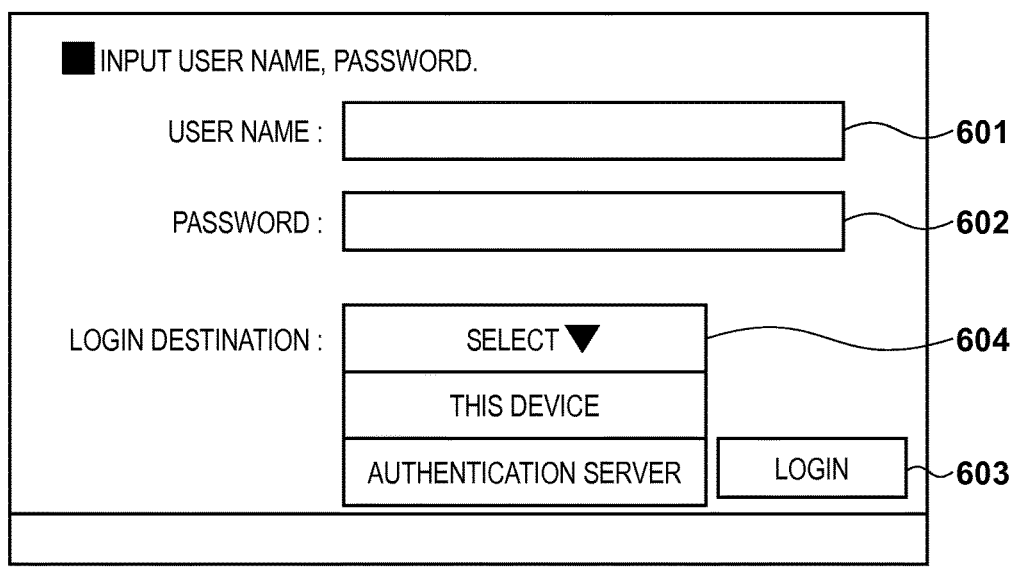
FIGS. 6A and 6B depict views illustrating examples of local authentication screens according to embodiments.

FIG. 6A depicts a view for showing an example of a local authentication screen according to embodiments.

The local authentication screen is displayed on the console unit 209 as a screen for providing a function for a user to perform a user authentication in order to use a function of the MFP 101 from the local UI.

A user name input field 601 is a field for a user to input a user name. A password input field 602 is a field for a user to input a password. A login button 603 is button for allowing execution of a user authentication. A login destination 604 is a pull-down menu for selecting whether to perform a user authentication in a local authentication by a common authentication processing module 312 of the MFP 101 ("this device"), or whether to perform the user authentication by the authentication server 103.

Figure 6B:
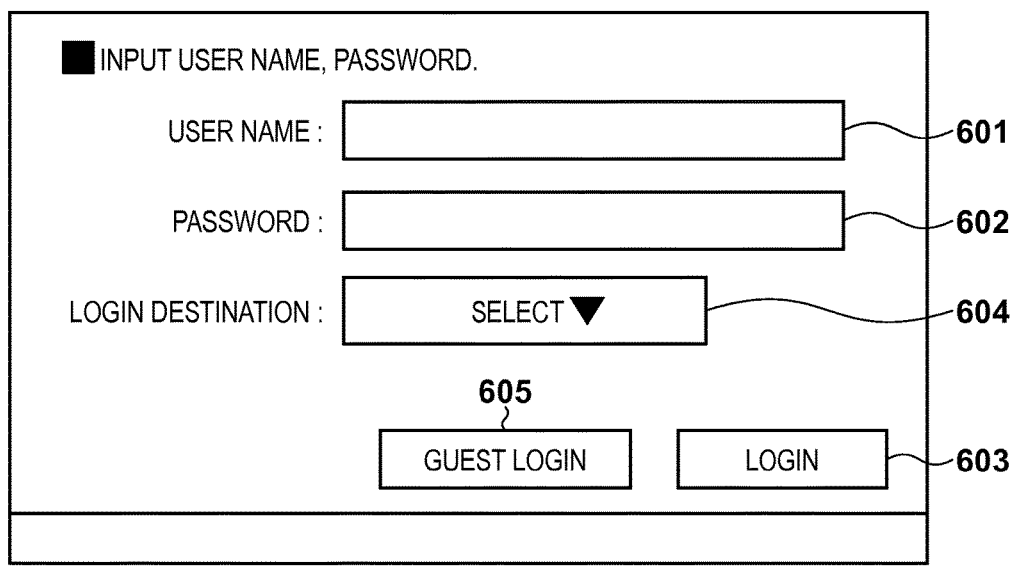

FIG. 6B depicts a view for showing another example of the local authentication screen according to embodiments. Note that, portions common to FIG. 6A are shown with the same reference numerals, and their explanation will be omitted.

The local authentication screen is something to which a function for logging in as a guest user is added to the screen (FIG. 6A) to provide a function for performing the user authentication in order for a user to use a function of the MFP 101 from the local UI. A guest login button 605 is a button for logging in by a guest user into the local UI, and the guest login button 605 is displayed on the local authentication screen in a case where a later explained setting value of "guest user usage" of a local authentication setting table of FIG. 5A is "ON".

When the user, via the screen of FIG. 6A, inputs a user name and a password, and presses the login button 603, a user authentication is performed by the device designated in the login destination 604 ("authentication server" in the example of FIG. 6A).

Figure 7A:
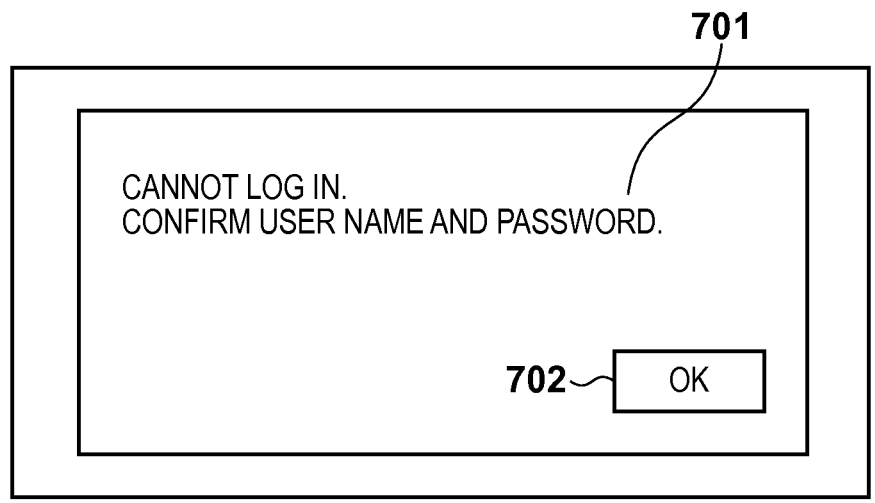
FIGS. 7A and 7B depict views for showing examples of a local authentication error screen.

The local authentication processing module 301, based on user input via the local authentication screen of FIG. 6A, makes a query, pertaining to a confirmation of the authentication and authority of the user, to the common authentication processing module 312. Also, the local authentication processing module 301 performs a comparison of the input of the user made via the local authentication screen of FIG. 6A and the data held in a local authentication setting DB 303. As illustrated in FIG. 6A, in a case where "authentication server" is selected for the login destination 604, the local authentication processing module 301 performs a query towards the authentication server 103 pertaining to confirmation of the authentication and the authority of the user in accordance with the pressing of the login button 603. The local authentication processing module 301 as a result of a query to the common authentication processing module 312 or the authentication server, determines whether or not the user can access the local UI by considering the result of comparison with the local authentication setting DB 303. Here, in a case where access to the local UI is denied, the local authentication processing module 301 displays a local authentication error screen as shown in FIG. 7A. In the example of a screen in FIG. 7A, a message stating that the login cannot be performed and prompting confirmation of the user name and the password is displayed.

FIG. 7A depicts a view for showing an example of the local authentication error screen.

The local authentication error screen of FIG. 7A illustrates an example of a screen displayed in a case where the result of the local authentication processing module 301 performing the user authentication was that the authentication failed. The error message 701 displays a message indicating that the authentication failed, and a message prompting the confirmation of the user name and the password. This is displayed in both the local authentication screens of FIG. 7A and FIG. 7B. An OK button 702 is a button for closing the local authentication error screen of FIG. 7A.

Figure 7B:
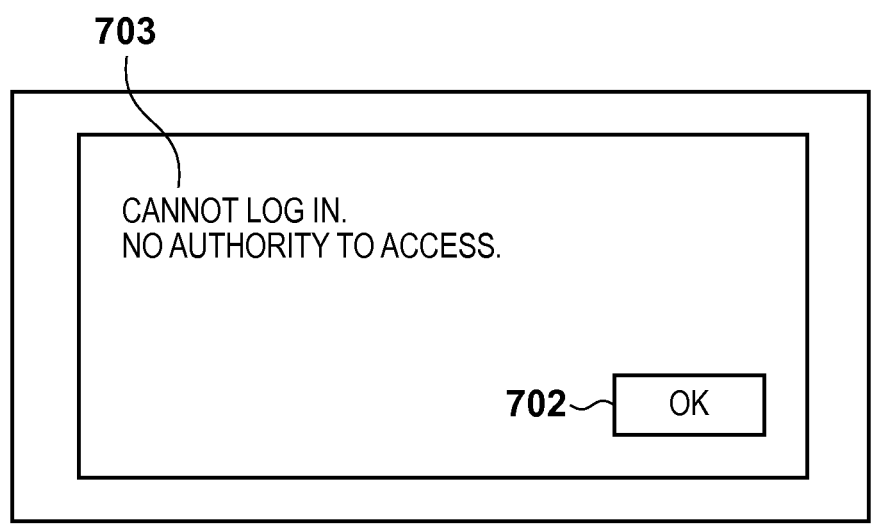

FIG. 7B depicts a view illustrating another example of a local authentication error screen.

This local authentication error screen is a screen displayed in a case where the result of local authentication processing module 301 performing the user authentication is that the authentication failed, and the error message is different to that of the local authentication error screen of FIG. 7A. An error message 703 is a message indicating that because the user does not have the authority to access, the login to the local UI failed. The error message 703 is displayed in a case where, a role of the user that tried to log in on the local authentication screen of FIG. 6A is less than a setting value 502 of "role permitted to login" in the local authentication setting table of FIG. 5A. The local authentication error screen of FIG. 7B is displayed when a setting value 506 of "guest user usage" in the common authentication setting table of FIG. 5C is "OFF" when a user tries to log in with the guest login button 605 on the local authentication screen of FIG. 6B.

A local authentication setting module 302 provides setting pertaining to a local authentication. The local authentication setting module 302, via the local UI control module 300, displays a local authentication setting screen shown in FIG. 11A, for example.

FIG. 11A depicts a view for showing an example of a screen for performing a setting related to the local authentication.

A "role permitted to log in local authentication" 1101 is a setting so that a user for which a role is set to a lower authority than a particular role cannot access the local UI. In a pull-down menu, one of Administrator (an administrator), Power User (a user having an authority), and General User (a general user) can be selected. The "guest user usage in local authentication" 1102 is a radio button for selecting whether or not a guest user that is able to use the MFP 101 from the local UI is useable without performing the user authentication. An "authentication server usage in local authentication" 1106 is a radio button for selecting whether or not to perform an authentication of a user in the local authentication on the authentication server 103. Here, when ON is selected for the "authentication server usage in local authentication" 1106, it becomes possible to perform an authentication of the user on the authentication server 103 in addition to the authentication of the user on the common authentication processing module 312. A cancel button 1104 is a button for cancelling the settings made on the local authentication setting screen of FIG. 11A. An OK button 1103 is a button for saving the settings made on the local authentication setting screen. In a case where the user presses the OK button 1103, the local authentication setting module 302 saves the contents selected on the local authentication setting screen of FIG. 11A into the local authentication setting table of FIG. 5A. Also, the values set by the local authentication setting screen of FIG. 11A are held in the local authentication setting DB 303. In the present embodiment, the local authentication setting screen of FIG. 11A is displayed only on the local UI, but configuration may be taken to allow the user to set from the remote UI by displaying the remote UI. The local authentication setting DB 303 is a database for storing local authentication information, which is information pertaining to the local authentication. The local authentication setting DB 303 is constructed in the HDD 204 and is stored in the HDD 204.

An example of the local authentication setting table stored in the local authentication setting DB 303 is shown in FIG. 5A.

In the local authentication setting table of FIG. 5A, "role permitted to login", "guest user usage", and "authentication server usage" are stored as setting items 501. In a setting value 502 of "role permitted to login", a value set in "role permitted to log in local authentication" 1101 of the local authentication setting screen of the above described FIG. 11A ("General User" in the figure) is stored. Accordingly, in such a case, a user capable of logging in by the local UI is General User or greater. A particular role is set as the setting value 502 of "role permitted to login", and this is used so that a user for which a role having a lower authority than the role set here is set cannot access the local UI. In the setting value 502 of "guest user usage", a value (ON/OFF) set in the "guest user usage in local authentication" 1102 of the local authentication setting screen of FIG. 11A is stored. In the setting value 502 of "authentication server usage", a value (ON/OFF) set in the "authentication server usage in local authentication" 1106 of the local authentication setting screen of FIG. 11A is stored. In FIG. 5A, in accordance with the setting of FIG. 11A, both "guest user usage" and "authentication server usage" are set to "ON".

A user information setting module 304 provides a function for setting information pertaining to a user for using the MFP 101. The user information setting module 304 displays a user information setting screen as shown in FIG. 10. In the present embodiment, the user information setting screen of FIG. 10 is displayed only on the local UI, but configuration may be taken to allow the user to set from the remote UI by displaying the remote UI.

FIG. 10 depicts a view for showing an example of a screen for setting information relating to a user.

A user ID 1001 is a text field for inputting a user ID which is an identifier for uniquely identifying a user. A password 1002 is a text field for inputting a password for authenticating the user designated by the user ID 1001. A role 1003 is a pull-down menu for selecting the role of the user designated in the user ID 1001. Items that can be selected here are role identifiers, which here include any of "Administrator", "Power User", "General User", and "Guest User". A cancel button 1005 is a button for cancelling the setting by the user information setting screen of FIG. 10. An OK button 1004 is a button for executing the setting via the user information setting screen. In a case where the user presses the OK button 1004, the user information setting module 304 saves the user information selected on the user information setting screen into the user information table (FIG. 4A).

A user information DB 305 is a database for storing the user information and role information which are information pertaining to a user. The user information DB 305 is constructed and stored in the HDD 204. Examples of the user information table and the role information table stored in the user information DB 305 are shown in FIGS. 4A and 4B.

In the user information table of FIG. 4A, user information set by the user on the user information setting screen of FIG. 10 is stored. A user ID 401 stores a value input in the user ID 1001, a password 402 stores a value input in the password 1002, and a role 403 stores a role name selected in the role 1003 respectively.

FIG. 4B depicts a view illustrating an example of the role information table.

The role information table stores information of each role. A role 410 is a name of a role, and four exist: Administrator, Power User, General User, Guest User (a guest user). This role information table stores information as to whether the usage of each of functions of copy 411, transmit 412, save 413, and set 414 are permitted or prohibited for each role name. Here, in a case where less functions are permitted for a role A than for role B, the role B is referred to as having a higher authority than the role A. Conversely, the role A is referred to as having a lower authority than the role B. Note that in roles 410 stored in this role information table, there are Administrator, Power User, General User, and Guest User, in order of highest to lowest authority.

A common authentication setting module 306 provides setting common to local authentication and remote authentication. The common authentication setting module 306, via the local UI control module 300, displays a common authentication setting screen of FIG. 11C, for example.

Figure 11B:
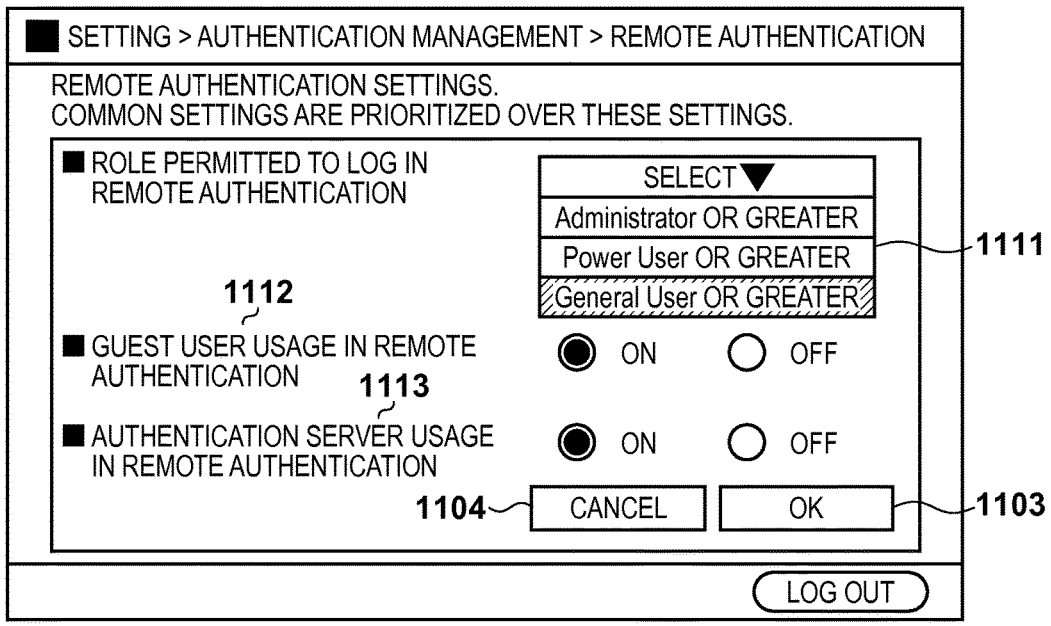
FIG. 11B depicts a view for showing an example of a screen for performing settings related to a remote authentication of a user.
Figure 11C:
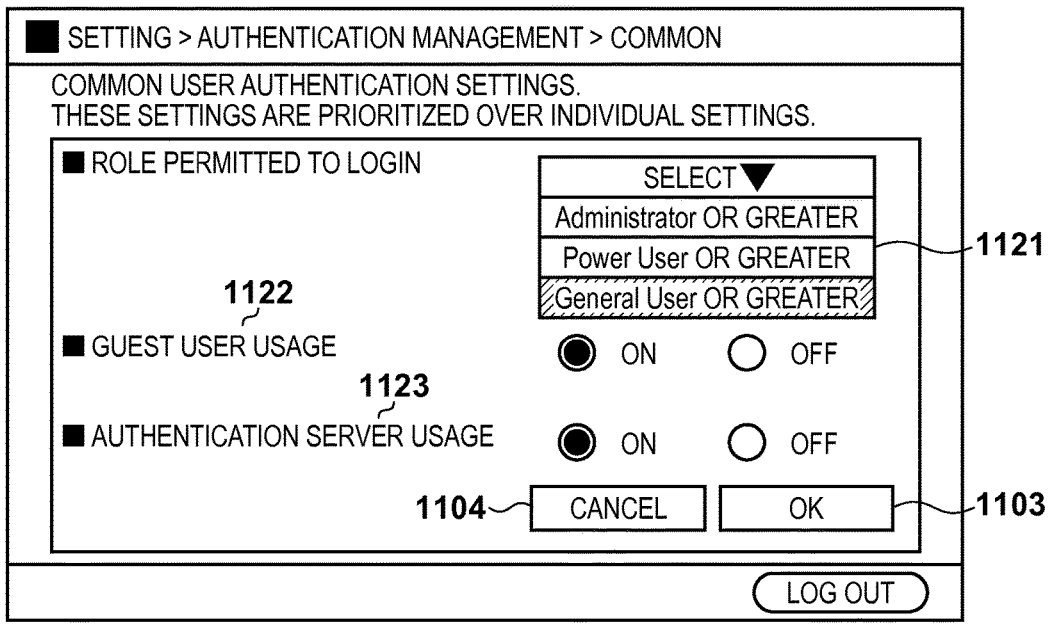
FIG. 11C depicts a view for showing an example of a screen for performing settings related to a common authentication of a user.

FIG. 11C depicts a view for showing an example of a common authentication setting screen for settings common to each authentication service such as the local authentication and the remote authentication.

A "role permitted to login" 1121 is a setting by which it is set so that a user, for which a role having a lower authority than the role set here is set, cannot access any of the UIs (the local UI, the remote UI, or the like). In the pull-down menu, one out of Administrator, Power User, and General User can be selected. The "role permitted to login" 1121 is prioritized over the "role permitted to perform local authentication log in" 1101 (FIG. 11A) and a "role permitted to log in remote authentication" 1111 (FIG. 11B). More specifically, in a case where the role set in the "role permitted to login" 1121 has a higher authority than that set in the "role permitted to log in local authentication" 1101 or the "role permitted to log in remote authentication" 1111, the setting of the "role permitted to login" 1121 is used.

A "guest user usage" 1122 is a radio button for selecting whether or not to make a guest user, which is a user capable of using the MFP 101 from the local UI and the remote UI without performing the user authentication, useable. The "guest user usage" 1122 is prioritized over the "guest user usage in local authentication" 1102 (FIG. 11A) and a "guest user usage in remote authentication" 1112 (FIG. 11B). More specifically, in a case where "guest user usage" 1122 is set to OFF, even if the "guest user usage in local authentication" 1102 or the "guest user usage in remote authentication" 1112 is set to ON, "guest user usage" 1122 OFF of FIG. 11C is used.

An "authentication server usage" 1123 is a radio button for selecting whether or not to perform the user authentication on the authentication server 103 for the local authentication and the remote authentication. The "authentication server usage" 1123 is prioritized over the "authentication server usage in local authentication" 1106 of FIG. 11A and an "authentication server usage in remote authentication" 1113 of FIG. 11B. More specifically, in a case where the "authentication server usage" 1123 is set to OFF, even if the "authentication server usage in local authentication" 1106 or the "authentication server usage in remote authentication" 1113 is set to ON, the OFF of the "authentication server usage" 1123 is used.

An OK button 1103 is a button for saving the setting of the common authentication setting screen of FIG. 11C. In a case where a user presses the OK button 1103, the common authentication setting module 306 saves the content selected in the common authentication setting screen of FIG. 11C into the common authentication setting table of FIG. 5C.

Then, the values set on the common authentication setting screen of FIG. 11C are held in a common authentication setting DB 307. In the present embodiment, the common authentication setting screen of FIG. 11C is displayed only on the local UI, but configuration may be taken to allow the user to set from the remote UI by displaying the remote UI.

The common authentication setting DB 307 is a database for storing common authentication setting information, which is information pertaining to settings common to the local authentication and the remote authentication. The common authentication setting DB 307 is constructed in the HDD 204 and is stored in the HDD 204.

FIG. 5C depicts a view for showing an example of the common authentication setting table stored in the common authentication setting DB 307.

In the common authentication setting table of FIG. 5C, "role permitted to login", "guest user usage", and "authentication server usage" are stored as a setting items 505. In a setting value 506 for "role permitted to login", a value set in the "role permitted to login" 1121 of the common authentication setting screen of FIG. 11C is stored. In a setting value 506 for "guest user usage", a value set in the "guest user usage" 1122 of the common authentication setting screen of FIG. 11C is stored. In a setting value 506 for "authentication server usage", a value set in the "authentication server usage" 1123 of the common authentication setting screen of FIG. 11C is stored.

A remote UI control module 308 provides a Web page to a Web browser on the PC 102 via the network I/F 208. The remote UI control module 308 notifies modules such as setting modules and processing modules of contents of operations of a user made on a Web browser. Also, the remote UI control module 308 performs control to receive requests from modules and display a Web page to a Web browser. If not identified specifically, the modules display a Web page to the Web browser via the remote UI control module 308.

A remote authentication processing module 309 provides a remote authentication function, which is for user authentication when the user uses the MFP 101 from a remote UI.

Figure 8A:
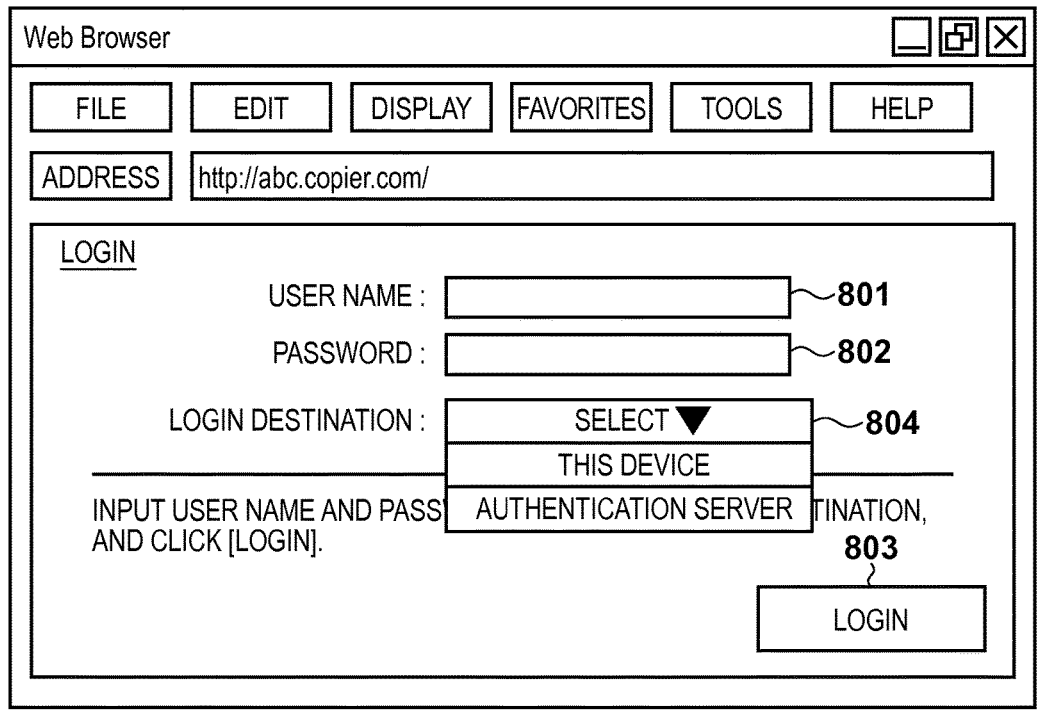
FIGS. 8A and 8B depicts views illustrating examples of remote authentication screens according to embodiments.

The remote authentication processing module 309 displays a remote authentication screen shown in FIG. 8A, for example.

FIG. 8A depicts a view illustrating an example of a remote authentication screen, according to embodiments.

The remote authentication screen is a screen for performing a user authentication for a user to use a function of the MFP 101 from the remote UI. A user name input field 801 is a field for a user of the MFP 101 to input a user name. A password input field 802 is a field for a user of the MFP 101 to input a password. A login destination 804 is a pull-down menu for selecting whether, in the remote authentication, to perform the authentication of the user by the common authentication processing module 312 or to perform the authentication of the user by the authentication server 103. A login button 803 is button for allowing execution of a user authentication.

Figure 8B:
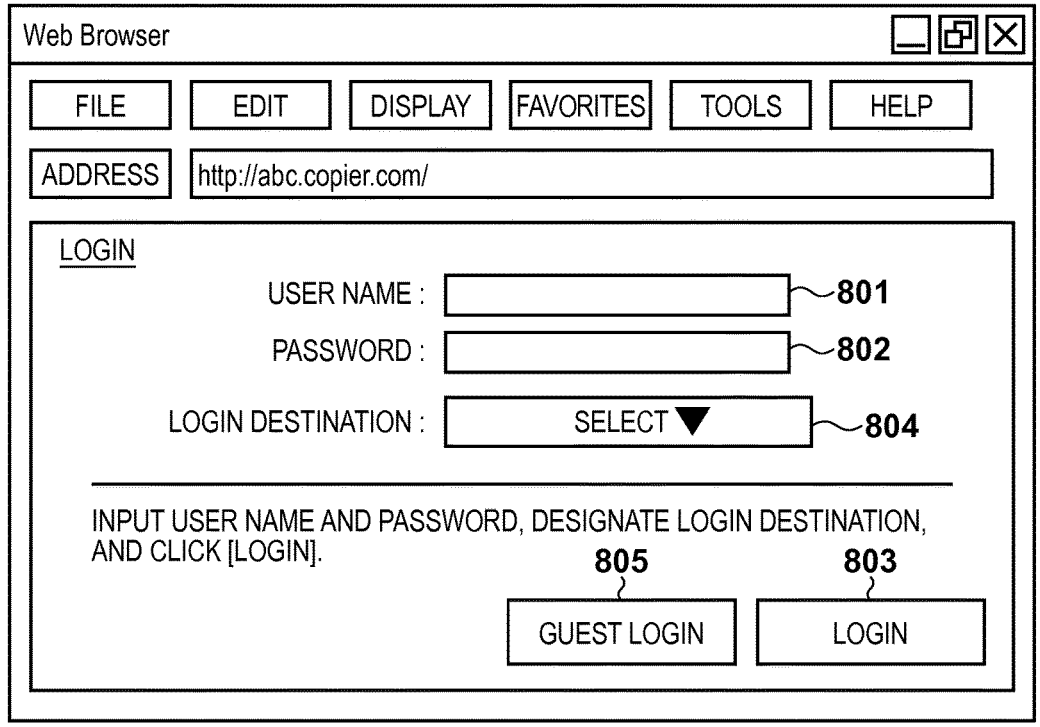

FIG. 8B depicts a view for showing another example of a remote authentication screen according to embodiments.

This remote authentication screen is something in which a function for logging in as a guest user is added to the screen (FIG. 8A) for performing the user authentication for a user using a function of the MFP 101 from the remote UI. In FIG. 8B, portions common to FIG. 8A are shown with the same reference numerals, and explanation of these will be omitted. A guest login button 805 is a button for logging in to the remote UI as a guest user, and in a case where setting value 504 for "guest user usage" of the remote authentication setting table of FIG. 5B is ON, this remote authentication screen is displayed.

The remote authentication processing module 309, based on user input via the remote authentication screen of FIG. 8A, performs a query, pertaining to a confirmation of authentication and authority of the user, to the common authentication processing module 312. Also, the remote authentication processing module 309 performs a comparison of the input of the user made via the remote authentication screen of FIG. 8A and the data held in a remote authentication setting DB 311. In a case where the authentication server is selected for the login destination 804, the remote authentication processing module 309 performs a query towards the authentication server 103 pertaining to confirmation of user authentication and authority. The remote authentication processing module 309, determines whether or not access of the remote UI is possible for the user considering the result of the query to the common authentication processing module 312 and a result of comparison with the remote authentication setting DB 311. In a case where an access of the remote UI is denied, the remote authentication processing module 309 displays a remote authentication error screen showing in FIG. 9A, for example.

Figure 9A:
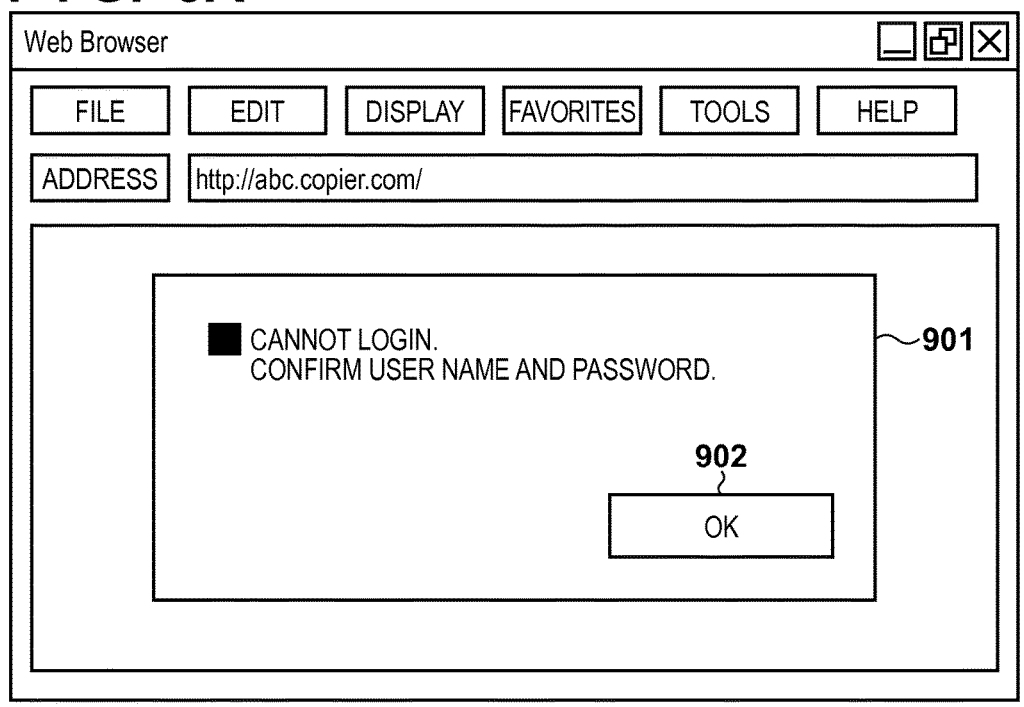
FIGS. 9A and 9B depict views illustrating examples of remote authentication error screens according to embodiments.

FIG. 9A depicts a view illustrating an example of a remote authentication error screen according to embodiments.

This remote authentication error screen is a screen displayed in a case where the result of the remote authentication processing module 309 performing the user authentication is that the authentication failed. An error message 901 is a message indicating that the authentication failed. The error message 901 is displayed in a case where the user name or the password that the user inputted is not correct, and either the remote authentication screen of FIG. 9A or that of 9B is displayed. An OK button 902 is a button for closing the remote authentication error screen.

Figure 9B:
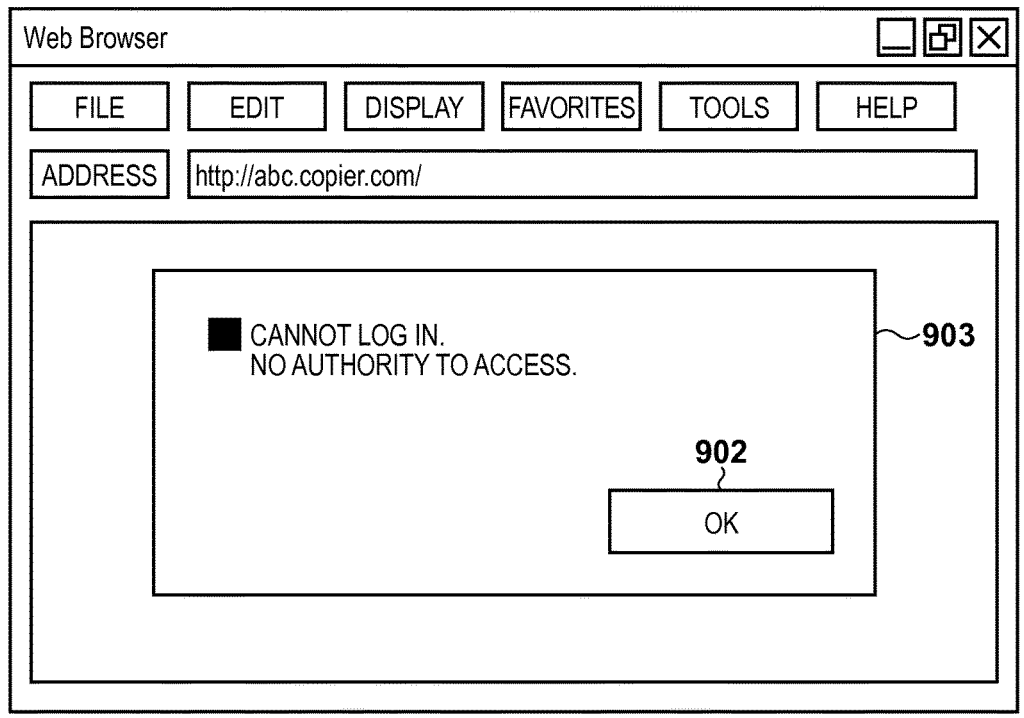

FIG. 9B depicts a view illustrating another remote authentication error screen.

This remote authentication error screen is a screen displayed in a case where the result of remote authentication processing module 309 performing the user authentication is that the authentication failed, and an error message 903 is different to that of the remote authentication error screen of FIG. 9A. The error message 903 is a message indicating that because the user does not have the authority to access the remote UI, the login to the remote UI failed. The error message 903 of FIG. 9B is displayed in a case where, a role of the user that tried to log in on the remote authentication screen of FIG. 8A is less than the setting value 504 of "role permitted to login" in the remote authentication setting table of FIG. 5B. In FIG. 5B, because the "role permitted to login" is "Administrator", only users having a role greater than or equal to Administrator is able to log in by the remote UI. Also, the error screen of FIG. 9B is displayed in a case where, when the setting value 506 of "guest user usage" of the common authentication setting table of FIG. 5C is set to OFF in the remote authentication screen of FIG. 8B, a user tried to log in by the guest login button 805.

A remote authentication setting module 310 provides setting pertaining to a remote authentication. The remote authentication setting module 310, via the local UI control module 300, displays a remote authentication setting screen shown in FIG. 11B, for example.

FIG. 11B depicts a view for showing an example of a screen for performing a setting related to a remote authentication of a user, according to embodiments.

The "role permitted to log in remote authentication" 1111 is a setting so that a user for which a role is set to a lower authority than the role set here cannot access the remote UI. In the pull-down menu, one out of Administrator, Power User, and General User can be selected. The "guest user usage in remote authentication" 1112 is a radio button for selecting whether or not to make a guest user, which is a user capable of using the MFP 101 from the remote UI without performing the user authentication, useable. The "authentication server usage in remote authentication" 1113 is a radio button for selecting whether or not to perform user authentication of a user in the remote authentication on the authentication server 103. In a case of ON, in addition to the authentication of the user by the common authentication processing module 312, performance of the user authentication by the authentication server 103 becomes possible. The cancel button 1104 is a button for cancelling the settings made on the remote authentication setting screen. The OK button 1103 is a button for saving the settings made on the remote authentication setting screen. In a case the user presses the OK button 1103, the remote authentication setting module 310 saves the contents selected on the remote authentication setting screen of FIG. 11B and saves to the remote authentication setting table of FIG. 5B.

In this way, the values set on the remote authentication setting screen of FIG. 11B are held in the remote authentication setting DB 311. In the present embodiments, only the remote authentication setting screen FIG. 11B is displayed on the local UI, but configuration may be taken to allow the user to set from the remote UI by displaying the remote UI.

The remote authentication setting DB 311 is a database for storing remote authentication setting information, which is information pertaining to the remote authentication. The remote authentication setting DB 311 is constructed and stored in the HDD 204. An example of the remote authentication setting table stored in the remote authentication setting DB 311 is shown in FIG. 5B.

In the remote authentication setting table of FIG. 5B, "role permitted to login", "guest user usage", and "authentication server usage" are stored as setting items 503. In the setting value 504 for "role permitted to login", a value set in the "role permitted to log in remote authentication" 1111 of the remote authentication setting screen of FIG. 11B is stored. A particular role is set as the setting value 504 for "role permitted to login", and this is used so that a user for which a role having a lower authority than the role set here is set cannot access the remote UI. In the setting value 504 for "guest user usage", a value set in the "guest user usage in remote authentication" 1112 of the remote authentication setting screen of FIG. 11B is stored. In the setting value 504 for "authentication server usage", a value set in the "authentication server usage in remote authentication" 1113 of the remote authentication setting screen of FIG. 11B is stored.

In the present embodiment, the local authentication setting DB 303, the remote authentication setting DB 311, and the common authentication setting DB 307 are divided as separate DBs, but the information held in each of these DBs may be held in a single DB.

The common authentication processing module 312 provides an authentication function common to both local authentication and remote authentication. When the common authentication processing module 312 receives a query pertaining to confirmation of a user authentication and authority from the local authentication processing module 301 or the remote authentication processing module 309, the common authentication processing module 312 performs confirmation of the authentication of the user and the authority of the user based on the data held in the user information DB 305 and the common authentication setting DB 307. The user authentication result and the authority of the user confirmed in this way are returned to the local authentication processing module 301 or the remote authentication processing module 309.

Also, in the present embodiment, the local authentication setting screen of FIG. 11A, the remote authentication setting screen of FIG. 11B, and the common authentication setting screen of FIG. 11C are divided into separate screens, but a user may be allowed to set on a single screen.

Below, an example of setting in each of the authentication setting screens is described.

In a case where, for all of the UIs, such as the local UI and the remote UI, only a user who has an "Administrator" role is allowed to access, the "role permitted to login" 1121 (FIG. 11C) is set to "Administrator". Also, in a case where only a user who has an "Administrator" role is allowed to access for the local UI only, the "role permitted to login" 1121 is set to "General User". Then, the "role permitted to log in local authentication" 1101 (FIG. 11A) is set to "Administrator", and the "role permitted to log in remote authentication" 1111 (FIG. 11B) is set to "General User". Also, in a case where only a user who has an "Administrator" role is allowed to access for only the remote UI, the "role permitted to login" 1121 (FIG. 11C) is set to "General User". Then, the "role permitted to log in local authentication" 1101 (FIG. 11A) is set to "General User", and the "role permitted to log in remote authentication" 1111 (FIG. 11B) is set to "Administrator".

Also, in a case where the guest login usage is prohibited in all of the UIs (the local UI and the remote UI), the "guest user usage" 1122 (FIG. 11C) is set to OFF. Also, in a case where the guest login is permitted only for the local UI, the "guest user usage" 1122 (FIG. 11C) is set to ON, the "guest user usage in local authentication" 1102 (FIG. 11A) is set to ON, and the "guest user usage in remote authentication" 1112 (FIG. 11B) is set to OFF. Furthermore, in a case where logging in as a guest user is permitted only for the remote UI, the "guest user usage" 1122 (FIG. 11C) is set to ON, the "guest user usage in local authentication" 1102 (FIG. 11A) is set to OFF, and the "guest user usage in remote authentication" 1112 (FIG. 11B) is set to ON.

Furthermore, in a case where the usage of the authentication server is prohibited in all UI (the local UI and the remote UI), the "authentication server usage" 1123 (FIG. 11C) is set to OFF. Also, in a case where the authentication by the authentication server is permitted for only the local UI, the "authentication server usage" 1123 (FIG. 11C) is set to ON, the "authentication server usage in local authentication" 1106 (FIG. 11A) is set to ON, and the "authentication server usage in remote authentication" 1113 (FIG. 11B) is set to OFF. Furthermore, in a case where the authentication by the authentication server is permitted for the remote UI only, the "authentication server usage" 1123 of FIG. 11C is set to ON, the "authentication server usage in local authentication" 1106 of FIG. 11A is set to OFF, and the "authentication server usage in remote authentication" 1113 of FIG. 11B is set to ON.

Note that, in the present embodiment, configuration is taken such that setting of an authority that is less than that of the "role permitted to login" 1121 of FIG. 11C can be performed with the "role permitted to log in local authentication" 1101 of FIG. 11A or the "role permitted to log in remote authentication" 1111 of FIG. 11B. However, configuration may be taken such that, in a case of an authority that is less than that of the common setting, a setting of the local authentication or the remote authentication cannot be performed.

Also, in the present embodiment, even in a case where the "guest user usage" 1122 of FIG. 11C is set to OFF, the "guest user usage in local authentication" 1102 of FIG. 11A or the "guest user usage in remote authentication" 1112 of FIG. 11B can be set to ON. However, configuration may be taken such that in such a case these cannot be set to ON.

Also, in the present embodiment, even in a case where the "authentication server usage" 1123 is set to OFF in FIG. 11C, the "authentication server usage in local authentication" 1106 of FIG. 11A and the "authentication server usage in remote authentication" 1113 of FIG. 11B can be set to ON. However, configuration may be taken such that in such a case these cannot be set to ON.

Below, explanation will be given for processing for user authentication in a local authentication and in a remote authentication. Regarding parts where there is no difference between the local authentication and the remote authentication, explanation is given for the processing of the local authentication, but for the processing of the remote authentication, the explanation is omitted.

Figure 12A:
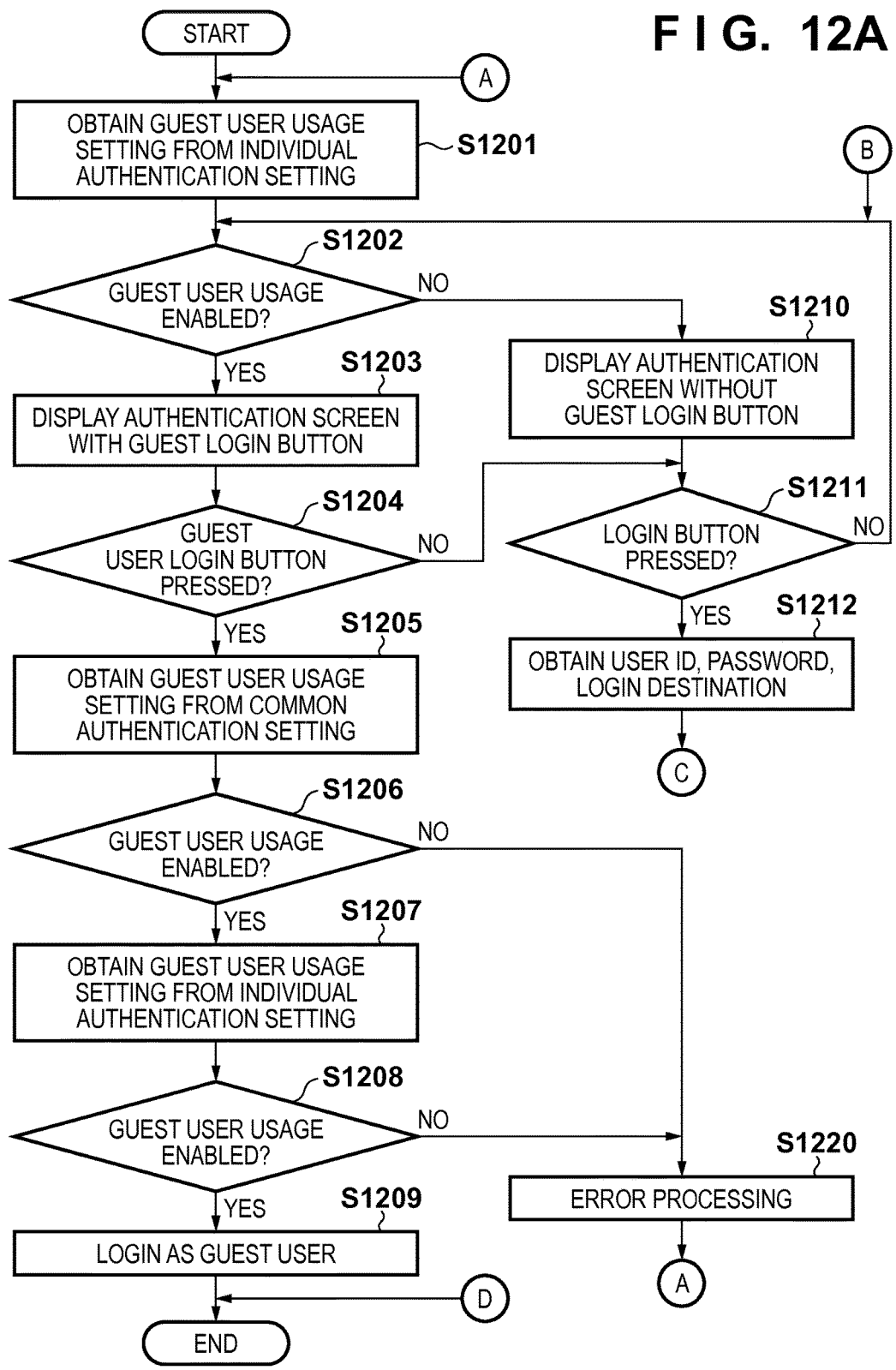

FIGS. 12A and 12B are flowcharts for describing a user authentication processing performed by the MFP 101 according to this embodiment. A program for causing the procedure shown in this flowchart to execute by the CPU 201 is stored in any of the RAM 203, the ROM 202, or the HDD 204, and by the CPU 201 executing the program, this processing is executed. Note that in the explanation below, explanation is given having the processing of this flowchart be performed by the modules shown in FIG. 3.

The processing is initiated by the electric power supply of the MFP 101 being turned on, by the local authentication processing module 301 displaying the local authentication screen shown in FIG. 6A, for example, on the console unit 209.

Firstly, in step S1201, the local authentication processing module 301 obtains the setting value 502 of "guest user usage" from the local authentication setting DB 303, and the processing proceeds to step S1202. Note that, in the present embodiment, the setting value 502 is obtained from the local authentication setting table of FIG. 5A, and as illustrated in FIG. 6A and FIG. 6B, the display or non-display of the guest login button 605 is switched. However, the switching may be performed with the setting value being obtained from the common authentication setting table of FIG. 5C.

In step S1202, the local authentication processing module 301 determines whether or not the setting value 502 of "guest user usage" is set to ON, and if it is set to ON, the processing proceeds to step S1203, but in a case where it is set to OFF, the processing proceeds to step S1210. In step S1203, the local authentication processing module 301 displays the local authentication screen shown in FIG. 6B on the console unit 209, and in step S1204, waiting is performed until the guest login button 605 or the login button 603 is pressed by the user. Meanwhile, the local authentication processing module 301, in step S1210, displays the local authentication screen shown in FIG. 6A on the console unit 209, and in step S1211, waiting is performed until the login button 603 is pressed by a user.

In a case where the user, in step S1204, presses the guest login button 605, the processing proceeds to step S1205, and the local authentication processing module 301 notifies the common authentication processing module 312 of the guest user log in. The common authentication processing module 312, having received the guest login notification from the local authentication processing module 301, obtains the setting value 506 (FIG. 5C) of "guest user usage" from the common authentication setting DB 307 in step S1205, and the processing proceeds to step S1206. In step S1206, the common authentication processing module 312 determines whether or not the setting value 506 of "guest user usage" is set to ON, and if it is set to ON, determines that a login by the guest user is possible, and makes a notification to the local authentication processing module 301 to that effect. With this, the processing proceeds to step S1207, and the local authentication processing module 301, having received the notification from the common authentication processing module 312, obtains the setting value 502 (FIG. 5A) of "guest user usage" from the local authentication setting DB 303, and the processing proceeds to step S1208. In step S1208, the local authentication processing module 301 determines whether or not the setting value 502 is set to ON, and if it is ON, determines that a login by the guest user is possible, and the processing proceeds to step S1209. In step S1209, the local authentication processing module 301 clears the local authentication screen of FIG. 6B, and sets such that the user is able to use functions of the MFP 101 under the authority of Guest User from the local UI, and the processing completes.

Meanwhile, in a case where, in step S1206, the setting value 506 of "guest user usage" of the common authentication setting table is OFF, the common authentication processing module 312 determines that the login by the guest user is impossible, and notifies the local authentication processing module 301 to that effect, and the processing proceeds to step S1220. Also, in a case where, in step S1208, the setting value 502 of "guest user usage" of the local authentication setting table is set to OFF, the local authentication processing module 301 determines that a login by the guest user is impossible, and executes step S1220. In step S1220, the local authentication processing module 301 displays the local authentication error screen of FIG. 7B on the console unit 209, and the processing proceeds to step S1201.

Meanwhile, when, in step S1211, it is determined that the login button 603 is pressed by the user, the processing proceeds to step S1212, and the local authentication processing module 301 obtains the user name, password, and login destination that the user input via the local authentication screen of FIG. 6A, and the processing proceeds to step S1213 (FIG. 12B). In step S1213, the local authentication processing module 301 determines whether or not the login destination is this device, and if it is, notifies the common authentication processing module 312 of the user name and the password, and the processing proceeds to step S1214. In step S1214, the common authentication processing module 312 compares the user name and password obtain from the local authentication processing module 301 with a user ID and password held in the user information DB 305. Here, in a case where both of these match, it is determined that the user authentication succeeds, and the processing advances to step S1215. Meanwhile, in a case where, in step S1214, both of these do not match, the common authentication processing module 312 determines that the authentication of the user fails, the processing proceeds to step S1226, error processing is executed, and the processing proceeds to step S1202 (FIG. 12A).

In step S1215, the common authentication processing module 312 obtains the setting value 506 (FIG. 5C) of "role permitted to login" from the common authentication setting DB 307, and the processing proceeds to step S1216. In step S1216, the common authentication processing module 312 compares the role designated for the user ID with the role obtained in step S1215. Then, in a case where the authority (the authority of the user) of the former is greater than or equal to the authority of the latter, it is determined that the user has the authority to use functions of the MFP 101 from the local UI, and notification to that effect is made to the local authentication processing module 301. The local authentication processing module 301, having received the notification from the common authentication processing module 312, executes the processing of step S1217. Meanwhile, in a case where, in step S1216, the authority of the former is less than the authority of the latter, the common authentication processing module 312 determines that the user does not have the authority to use functions of the MFP 101 from the local UI, and notification to that effect is made to the local authentication processing module 301. The local authentication processing module 301, having received the notification from the common authentication processing module 312, executes the processing of step S1226.

In step S1217, the local authentication processing module 301 obtains the setting value 502 of "role permitted to login" from the local authentication setting DB 303, and the processing advances to step S1218. In step S1218, the local authentication processing module 301 compares the role designated for the user ID and the role obtained in step S1217, and in a case where the authority (the authority of the user) of the former is greater than or equal to the authority of the latter, it is determined that the user has the authority to use functions of the MFP 101 from the local UI, and the processing proceeds to step S1219. In step S1219, the local authentication processing module 301 clears the local authentication screen of FIG. 6A on the console unit 209, and sets such that the user can use the functions of the MFP 101 with the authority of the role designated for the user ID from the local UI, and the processing completes.

Meanwhile, in a case where it is determined, in step S1218, that the authority of the former is less than the authority of the latter, the local authentication processing module 301 determines that the user has no authority to use functions of the MFP 101 from the local UI, and step S1226 is executed. In step S1226, the local authentication processing module 301 displays the local authentication error screen of FIG. 7B on the console unit 209, and the processing advances to step S1202.

Meanwhile, when it is determined, in step S1213, that the login destination is not this device, the local authentication processing module 301 advances the processing to step S1221. In step S1221, the common authentication processing module 312 obtains the setting value 506 (FIG. 5C) of "authentication server usage" from the common authentication setting DB 307, and advances the processing to step S1222. In step S1222, the common authentication processing module 312 determines whether or not the setting value 506 of "authentication server usage" is set to ON, and if it is ON, it is determined that the authentication of the user is possible by the authentication server 103, and advances the processing to step S1223, and notification to that effect is made to the local authentication processing module 301. In step S1223, the local authentication processing module 301 obtains the setting value 502 (FIG. 5A) of "authentication server usage" from the local authentication setting DB 303, and advances the processing to step S1224. In step S1224, the local authentication processing module 301 determines whether or not the setting value 502 of "authentication server usage" is ON, and if it is ON, determines that the user authentication by the authentication server 103 is possible, and advances the processing to step S1225. In step S1225, the local authentication processing module 301 notifies the authentication server 103 of the user name and the password, and requests the authentication of the user. Then, when the result of the authentication by the authentication server 103 is that it is determined that authentication succeeded, the processing proceeds to step S1219, and in a case where the authentication of the user failed, step S1226 is executed.

Also, in a case where, in step S1222, the setting value 506 of "authentication server usage" is OFF, the common authentication processing module 312 treats the user authentication on the authentication server 103 as impossible, and makes a notification to the local authentication processing module 301 to that effect. The local authentication processing module 301, having received the notification from the common authentication processing module 312, executes the processing of step S1226. Also, in a case where in step S1224 the setting value 502 of "authentication server usage" is OFF, the local authentication processing module 301 determines that the user authentication on the authentication server 103 is impossible, and step S1226 is executed. Furthermore, if the result of the authentication by the authentication server 103 in step S1225 is that the authentication failed, the local authentication processing module 301 executes step S1226.

As explained above, by virtue of this embodiment, it becomes possible to provide different authentication modes for each authentication service, such as local authentication or remote authentication processing, while performing unified authentication of users by the common authentication processing module 312. Also, even in a case where an authentication processing module for a new UI is added, it is possible to perform unified user authentication because the common authentication processing module 312 can be used.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-259506, filed Dec. 16, 2013, which is hereby incorporated by reference herein in its entirety.

What is claimed is:

1. An information processing apparatus capable of being used via a plurality of user interfaces, the information processing apparatus comprising:
    a storage device that stores settings related to a user login, the settings including (a) information indicating a user authority to use the information processing apparatus via a first type of user interface of the plurality of user interfaces and (b) information indicating a user authority to use the information processing apparatus via a second type of user interface of the plurality of user interfaces;
    at least one processor; and
    a memory device that stores a set of instructions,
    wherein the at least one processor executes instructions, of the set of instructions, to implement the following modules:
    (1) a first authorization control module configured to determine whether or not a user having user identification information has a user authority to use the information processing apparatus via a user interface by which the user has input the user identification information, based on (a) a user authority corresponding to the user identification information input via the first type of user interface or the second type of user interface, (b) a type of the user interface via which the user identification information has been input, and (c) the settings stored in the storage device,
    (2) a second authorization control module configured to determine whether or not the user having the user identification information has the user authority to use the information processing apparatus both (a) when the user uses the information processing apparatus via the first type of user interface and (b) when the user uses the information processing apparatus via the second type of user interface, and
(3) a determination module configured to determine whether or not the user having the user identification information has the user authority to use the information processing apparatus in a case that (a) the second authorization control module determines that the user having the user identification information has the user authority to use the information processing apparatus and (b) the first authorization control module determines that the user has the user authority to use the information processing apparatus via the user interface by which the user has input the user identification information.

2. The information processing apparatus according to claim 1, wherein the at least one processor further executes instructions, of the set of instructions, to implement the following modules:
a common authentication module configured to authenticate a user based on authentication information both when the user uses the information processing apparatus via the first type of user interface and when the user uses the information processing apparatus via the second type of user interface; and
a login processing module configured to perform user login processing in a case that the common authentication module authenticates the user and the determination module determines that the authenticated user has the user authority to use the information processing apparatus.

3. The information processing apparatus according to claim 2, wherein the login processing module does not perform the user login processing of the user in a case that the common authentication module fails to authenticate the user and
wherein the login processing module does not authenticate the user in a case that the determination unit determines that the user does not have the user authority.

4. The information processing apparatus according to claim 1, wherein the first type of user interface is a local user interface that is displayed on a display of the information processing apparatus, and
wherein the second type of user interface is a remote user interface that is displayed using a Web browser.

5. The information processing apparatus according to claim 1, wherein the at least one processor further executes instructions, of the set of instructions, to implement a setting module configured to cause the storage device to store the settings input via a setting screen in which the settings are input by a user.

6. The information processing apparatus according to claim 2, wherein the storage device is configured to further store credential information,
wherein the common authentication module authenticates the user having the user identification information based on the user identification information input via the first type of user interface or the second type of user interface and the credential information stored in the storage device, and
wherein the login processing module performs the user login processing of the user in a case that the common authentication module authenticates the user and the determination module determines that the user having the user having the user identification information has the user authority.

7. The information processing apparatus according to claim 5, wherein the credential information includes a user ID and a password.

8. A method of controlling an information processing apparatus (1) capable of being used via a plurality of user interfaces, and (2) having a storage device that stores settings related to a user login, the settings including (a) information indicating a user authority to use the information processing apparatus via a first type of user interface of the plurality of user interfaces and (b) information indicating a user authority to use the information processing apparatus via a second type of user interface of the plurality of user interfaces, the method comprising:
determining whether or not a user having user identification information has a user authority to use the information processing apparatus via a user interface by which the user has input the user identification information, based on (a) a user authority corresponding to the user identification information input via the first type of user interface or the second type of user interface, (b) a type of user interface via which the user identification information has been input, and (c) the settings stored in the storage device;
determining whether or not the user having the user identification information has the user authority to use the information processing apparatus both (a) when the user uses the information processing apparatus via the first type of user interface and (b) when the user uses the information processing apparatus via the second type of user interface; and
determining whether or not the user having the user identification information has the user authority to use the information processing apparatus in a case (a) that it is determined that the user having the user identification information has the user authority to use the information processing apparatus (b) and it is determined that the user has the user authority to use the information processing apparatus via the user interface via which the user has input the user identification information.

9. A non-transitory computer readable storage medium storing a program for causing a processor to execute a method of controlling an information processing apparatus (1) capable of being used via a plurality of user interfaces, and (2) having a storage device that stores settings related to a user login, the settings including (a) information indicating a user authority to use the information processing apparatus via a first type of user interface of the plurality of user interfaces and (b) information indicating a user authority to use the information processing apparatus via a second type of user interface of the plurality of user interfaces, the method comprising:
determining whether or not a user having user identification information has a user authority to use the information processing apparatus via a user interface by which the user has input the user identification information, based on (a) a user authority corresponding to the user identification information input via the first type of user interface or the second type of user interface, (b) a type of user interface via which the user identification information has been input, and (c) the settings stored in the storage device;
determining whether or not the user having the user identification information has the user authority to use the information processing apparatus both (a) when the user uses the information processing apparatus via the first type of user interface and (b) when the user uses the information processing apparatus via the second type of user interface; and determining whether or not the user having the user identification information has the user authority to use the information processing apparatus in a case that (a) it is determined that the user having the user identification information has the user authority to use the information processing apparatus and (b) it is determined that the user has the user authority to use the information processing apparatus via the user interface by which the user has input the user identification information.

10. An information processing apparatus capable of being used via a plurality of user interfaces, the information processing apparatus comprising:

a storage device that stores settings related to a user login, the settings including (a) information indicating a user authority to use the information processing apparatus via a first type of user interface of the plurality of user interfaces and (b) information indicating a user authority to use the information processing apparatus via a second type of user interface of the plurality of user interfaces;

at least one processor; and a memory device that stores a set of instructions, wherein the at least one processor executes instructions, of the set of instructions, to implement the following modules:

a common authentication module configured to authenticate a user based on authentication information both (a) when a user uses the information processing apparatus via the first type of user interface and (b) when a user uses the information processing apparatus via the second type of user interface;

an authorization control module configured to determine whether or not a user having user identification information has a user authority to use the information processing apparatus via a user interface by which the user has input the user identification information, based on a (a) user authority corresponding to the user identification information input via the first type of user interface or the second type of user interface, (b) a type of user interface via which the user identification information has been input, and (c) the settings stored in the storage device; and a login processing module configured to perform login processing of the user in a case that the common authentication module authenticates the user and the authorization control module determines that the user having the user identification information has the user authority to use the information processing apparatus via the type of user interface by which the user has input the user identification information.

11. A method of controlling an information processing apparatus (1) capable of being used via a plurality of user interfaces, and (2) having a storage device that stores settings related to a user login, the settings including (a) information indicating a user authority to use the information processing apparatus via a first type of user interface of the plurality of user interfaces and (b) information indicating a user authority to use the information processing apparatus via a second type of user interface of the plurality of user interfaces, the method comprising:

authenticating a user based on authentication information both (a) when a user uses the information processing apparatus via the first type of user interface and (b) when a user uses the information processing apparatus via the second type of user interface;

determining whether or not a user having user identification information has a user authority to use the information processing apparatus via a user interface by which the user has input the user identification information, based on (a) a user authority corresponding to the user identification information input via the first type of user interface or the second type of user interface, (b) a type of user interface via which the user identification information has been input, and (c) the settings stored in the storage device; and performing login processing of the user in a case that the user is authenticated in the authenticating and it is determined in the determining that the user having the user identification information has the user authority to use the information processing apparatus via the type of user interface by which the user has input the user identification information.

12. A non-transitory computer readable storage medium storing a program for causing a processor to execute a method of controlling an information processing apparatus (1) capable of being used via a plurality of user interfaces, and (2) having a storage device that stores settings related to a user login including (a) information indicating a user authority to use the information processing apparatus via a first type of user interface of the plurality of user interfaces and (b) information indicating a user authority to use the information processing apparatus via a second type of user interface of the plurality of user interfaces, the method comprising:

authenticating a user based on authentication information both (a) when a user uses the information processing apparatus via the first type of user interface and (b) when a user uses the information processing apparatus via the second type of user interface;

determining whether or not a user having user identification information has a user authority to use the information processing apparatus via a user interface by which the user has input the user identification information, based on (a) a user authority corresponding to the user identification information input via the first type of user interface or the second type of user interface, (b) a type of user interface via which the user identification information has been input, and (c) the settings stored in the storage device; and performing login processing of the user in a case that the user is authenticated in the authenticating and it is determined in the determining that the user having the user identification information has the user authority to use the information processing apparatus via the type of user interface by which the user has input the user identification information.

* * * * *